US011252552B2

(12) United States Patent
Huang et al.

(10) Patent No.: US 11,252,552 B2
(45) Date of Patent: Feb. 15, 2022

(54) APPARATUS, SYSTEM AND METHOD OF COMMUNICATING IN A NEIGHBOR AWARENESS NETWORKING (NAN) GROUP

(71) Applicant: INTEL IP CORPORATION, Santa Clara, CA (US)

(72) Inventors: Po-Kai Huang, San Jose, CA (US); Elad Oren, Tel Aviv (IL); Dibakar Das, Troy, NY (US); Emily H. Qi, Gig Harbor, WA (US); Minyoung Park, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 280 days.

(21) Appl. No.: 16/125,710

(22) Filed: Sep. 9, 2018

(65) Prior Publication Data

US 2019/0141512 A1 May 9, 2019

Related U.S. Application Data

(63) Continuation of application No. 14/998,221, filed on Dec. 26, 2015, now Pat. No. 10,104,531.

(Continued)

(51) Int. Cl.
| | | |
|---|---|---|
| *H04W 8/00* | (2009.01) | |
| *H04W 68/02* | (2009.01) | |
| *H04W 48/16* | (2009.01) | |
| *H04W 72/04* | (2009.01) | |
| *H04W 40/24* | (2009.01) | |

(Continued)

(52) U.S. Cl.
CPC ........... *H04W 8/005* (2013.01); *H04W 48/16* (2013.01); *H04W 68/02* (2013.01); *H04W 72/0446* (2013.01); *H04L 67/1078* (2013.01); *H04W 24/08* (2013.01); *H04W 40/246* (2013.01); *H04W 52/0216* (2013.01); *H04W 56/001* (2013.01); *H04W 72/121* (2013.01); *Y02D 30/70* (2020.08)

(58) Field of Classification Search
CPC .. H04W 48/16; H04W 40/246; H04W 72/121
USPC ......................................................... 370/329
See application file for complete search history.

(56) References Cited

U.S. PATENT DOCUMENTS

| | | |
|---|---|---|
| 10,104,531 B2 | 10/2018 | Huang et al. |
| 2002/0143905 A1 | 10/2002 | Govindarajan et al. |

(Continued)

OTHER PUBLICATIONS

Wi-Fi Neighbour Awareness Networking (NAN), Technical Specification, Version 1.0, May 1, 2015, 98 pages.

(Continued)

*Primary Examiner* — Christopher M Crutchfield
*Assistant Examiner* — Jean F Voltaire
(74) *Attorney, Agent, or Firm* — Shichrur & Co.

(57) ABSTRACT

Some demonstrative embodiments include apparatuses, systems and/or methods of communicating in a data path group. For example, an apparatus may include logic and circuitry configured to cause a Neighbor Awareness Networking (NAN) device to communicate during one or more Discovery Windows (DW) of a NAN cluster; and to communicate with one or more NAN devices of at least one data path group having a data path topology according to a scheduling scheme corresponding to the data path topology, the data path group including two or more NAN devices of the NAN cluster.

23 Claims, 7 Drawing Sheets

Related U.S. Application Data

(60) Provisional application No. 62/182,687, filed on Jun. 22, 2015.

(51) Int. Cl.
*H04W 72/12* (2009.01)
*H04W 56/00* (2009.01)
*H04L 29/08* (2006.01)
*H04W 52/02* (2009.01)
*H04W 24/08* (2009.01)

(56) References Cited

U.S. PATENT DOCUMENTS

| | | |
|---|---|---|
| 2006/0182034 A1 | 8/2006 | Klinker et al. |
| 2009/0119396 A1 | 5/2009 | Kanda |
| 2015/0098388 A1 | 4/2015 | Fang et al. |
| 2015/0109981 A1* | 4/2015 | Patil ............... H04L 67/1078 370/311 |
| 2015/0319029 A1 | 11/2015 | Abraham et al. |
| 2015/0365319 A1* | 12/2015 | Finn ............... H04L 41/0668 370/221 |
| 2016/0286574 A1* | 9/2016 | Abraham ............ H04W 12/003 |
| 2016/0374011 A1 | 12/2016 | Huang et al. |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

Wi-Fi Peer-to-Peer (P2P), Technical Specification, Version 1.5, 2014, Aug. 4, 2014, 183 pages.

Office Action for U.S. Appl. No. 14/998,221, dated Aug. 24, 2017, 21 pages.

Office Action for U.S. Appl. No. 14/998,221, dated Feb. 9, 2018, 18 pages.

Notice of Allowance for U.S. Appl. No. 14/998,221, dated Jun. 7, 2018, 16 Pages.

* cited by examiner

APPARATUS, SYSTEM AND METHOD OF COMMUNICATING IN A NEIGHBOR AWARENESS NETWORKING (NAN) GROUP

CROSS REFERENCE

This application claims the benefit of and priority from U.S. Provisional Patent Application No. 62/182,687 entitled "APPARATUS, SYSTEM AND METHOD OF COMMUNICATING ACCORDING TO A DATA PATH TOPOLOGY", filed Jun. 22, 2015, the entire disclosure of which is incorporated herein by reference.

TECHNICAL FIELD

Embodiments described herein generally relate to communicating in a data path group.

BACKGROUND

Awareness networking, for example, according to a Wireless Fidelity (Wi-Fi) Aware Specification, may enable wireless devices, for example, Wi-Fi devices, to perform device/service discovery, e.g., in their close proximity.

The awareness networking may include forming a cluster, e.g., a Wi-Fi Aware cluster, for devices in proximity. Devices in the same Wi-Fi Aware cluster may be configured to follow the same time schedule, e.g., a discovery window (DW), for example, to facilitate cluster formation and/or to achieve low power operation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
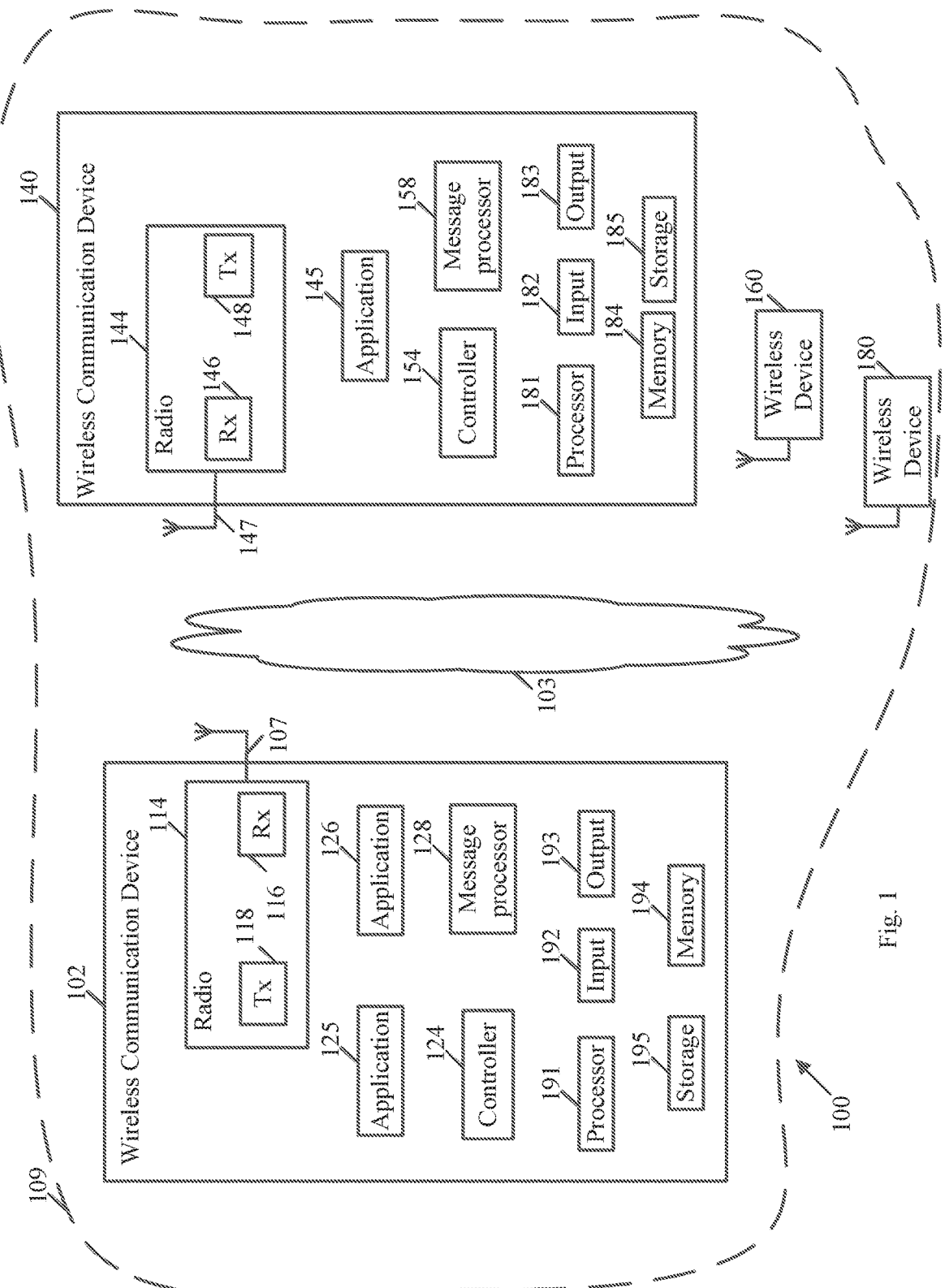
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including *Wi-Fi Neighbor Awareness Networking (NAN) Technical Specification, Version 1.0*, May 1, 2015) and/or future versions and/or derivatives thereof, devices and/or networks operating in accordance with existing WFA Peer-to-Peer (P2P) specifications (*WiFi P2P technical specification, version 1.5*, Aug. 4, 2014) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1*, April 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); *IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz*

Band", 28 Dec. 2012); and/or IEEE-802.11REVmc ("*IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 140, 160 and/or 180.

In some demonstrative embodiments, wireless communication devices 102, 140, 160 and/or 180 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102, 140, 160 and/or 180 may include, operate as, and/or perform the functionality of one or more STAs. For example, device 102 may include at least one STA, and/or device 140 may include at least one STA.

In some demonstrative embodiments, devices 102, 140, 160 and/or 180 may include, operate as, and/or perform the functionality of one or more WLAN STAs.

In some demonstrative embodiments, devices 102, 140, 160 and/or 180 may include, operate as, and/or perform the functionality of one or more Wi-Fi STAs.

In some demonstrative embodiments, devices 102, 140, 160 and/or 180 may include, operate as, and/or perform the functionality of one or more BT devices.

In some demonstrative embodiments, devices 102, 140, 160 and/or 180 may include, operate as, and/or perform the functionality of one or more Neighbor Awareness Networking (NAN) STAs.

In some demonstrative embodiments, one or more devices of wireless communication devices 102, 140, 160 and/or 180, e.g., device 140, may include, or may perform the functionality of, an Access Point (AP), e.g., as described below.

For example, the AP may include a router, a PC, a server, a Hot-Spot and/or the like.

In some demonstrative embodiments, one or more devices of wireless communication devices 102, 140, 160 and/or 180, e.g., device 102, may perform the functionality of a non-AP STA, and/or one or more devices of wireless communication devices 102, 140, 160 and/or 180, e.g., device 140, may perform the functionality of an AP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or devices 140, 160 and/or 180 may include, for example, one or more of a processor 181, an input unit 182, an output unit 183, a memory unit 184, and/or a storage unit 185. Devices 102, 140, 160 and/or 180 may optionally include other suitable hardware components and/or software components. In some demonstrative embodiments, some or all of the components of one or more of devices 102, 140, 160 and/or 180 may be enclosed in a common housing or packaging, and may be interconnected or operably associated using one or more wired or wireless links. In other embodiments, components of one or more of devices 102, 140, 160 and/or 180 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140, 160 and/or 180 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 140, 160 and/or 180 may include one or more radios including circuitry and/or logic to perform wireless communication between devices 102, 140, 160, 180 and/or one or more other wireless communication devices. For example, device 102 may include at least one radio 114, and/or device 140 may include at least one radio 144.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may be configured to communicate over a 2.4 GHz band, a 5 GHz band, a mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102, 140, 160 and/or 180 may form, and/or may communicate as part of, a wireless local area network (WLAN).

In some demonstrative embodiments, wireless communication devices 102, 140, 160 and/or 180 may form, and/or may communicate as part of, a WiFi network.

In some demonstrative embodiments, wireless communication devices 102, 140, 160 and/or 180 may form, and/or may communicate as part of, a WiFi Direct (WFD) network, e.g., a WiFi direct services (WFDS) network, and/or may perform the functionality of one or more WFD devices.

In one example, wireless communication devices 102, 140, 160 and/or 180 may include, or may perform the functionality of a WiFi Direct device.

In some demonstrative embodiments, wireless communication devices 102, 140, 160 and/or 180 may be capable of performing awareness networking communications, for example, according to an awareness protocol, e.g., a WiFi aware protocol, and/or any other protocol, e.g., as described below.

In some demonstrative embodiments, wireless communication devices 102, 140, 160 and/or 180 may be capable of forming, and/or communicating as part of, a Neighbor Awareness Networking (NAN) network, e.g., a WiFi NAN or WiFi Aware network, and/or may perform the functionality of one or more NAN devices ("WiFi aware devices").

In some demonstrative embodiments, wireless communication medium 103 may include a direct link, for example, a PTP link, e.g., a WiFi direct P2P link or any other PTP link, for example, to enable direct communication between wireless communication devices 102, 140, 160 and/or 180.

In some demonstrative embodiments, wireless communication devices 102, 140, 160 and/or 180 may perform the functionality of WFD P2P devices. For example, devices 102, 140, 160 and/or 180 may be able to perform the functionality of a P2P client device, and/or P2P group Owner (GO) device.

In other embodiments, wireless communication devices 102, 140, 160 and/or 180 may form, and/or communicate as part of, any other network, and/or may perform the functionality of any other wireless devices or stations.

In some demonstrative embodiments, devices 102, 140, 160 and/or 180 may include one or more applications configured to provide, share, and/or use one or more services, e.g., a social application, a file sharing application, a gaming application, a media application and/or the like, for example, using an awareness network, NAN network ("WiFi Aware network"), a PTP network, a P2P network, WFD network, and/or any other network.

In some demonstrative embodiments, device 102 may execute an application 125 and/or an application 126. In some demonstrative embodiments, device 140 may execute an application 145.

In some demonstrative embodiments, devices 102, 140, 160 and/or 180 may be capable of sharing, showing, sending, transferring, printing, outputting, providing, synchronizing, and/or exchanging content, data, and/or information, e.g., between applications and/or services of devices 102, 140, 160 and/or 180 and/or one or more other devices.

In some demonstrative embodiments, devices 102, 140, 160 and/or 180 may include a controller configured to control one or more functionalities of devices 102, 140, 160 and/or 180, for example, one or more functionalities of communication, e.g., awareness networking communications, WiFi Aware (NAN) communication and/or any other communication, between devices 102, 140, 160 and/or 180 and/or other devices, and/or any other functionality, e.g., as described below. For example, device 102 may include a controller 124, and/or device 140 may include a controller 154.

In some demonstrative embodiments, controllers 124 and/or 154 may be configured to perform one or more functionalities, communications, operations and/or procedures between wireless communication devices 102, 140, 160 and/or 180, and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154. Additionally or alternatively, one or more functionalities of c controllers 124 and/or 154 may be implemented by logic.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In one example, controller 124 may perform one or more functionalities of a NAN engine, e.g., a NAN discovery engine (DE), for example to process one or more service queries and/or responses, e.g., from applications and/or services on devices 102, 140, 160 and/or 180, and/or one or more other devices.

In one example, controller 154 may perform one or more functionalities of a NAN engine, e.g., a NAN discovery engine (DE), for example to process one or more service queries and/or responses, e.g., from applications and/or services on devices 102, 140, 160 and/or 180, and/or one or more other devices.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In one example, message processors 128 and/or 158 may perform one or more functionalities of a NAN MAC configured to generate, process and/or handle one or more NAN messages, e.g., NAN Beacon frames and/or NAN Service Discovery frames.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124, radio 114, and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In some demonstrative embodiments, at least part of the functionality of message processor 158 may be implemented as part of radio 144.

In some demonstrative embodiments, at least part of the functionality of message processor 158 may be implemented as part of controller 154.

In other embodiments, the functionality of message processor 158 may be implemented as part of any other element of device 140.

In some demonstrative embodiments, at least part of the functionality of controller 154, radio 144, and/or message processor 158 may be implemented by an integrated circuit, for example, a chip, e.g., a System in Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In some demonstrative embodiments, devices 102, 140, 160 and/or 180 may perform the functionality of a device or station, for example, an awareness networking device, a NAN device, a WiFi device, a WiFi Aware device, a WFD device, a WLAN device and/or any other device, capable of discovering other devices according to a discovery protocol and/or scheme.

In some demonstrative embodiments, radios 114 and/or 144 may communicate over wireless communication medium 103 according to an awareness networking scheme, for example, a discovery scheme, for example, a WiFi Aware discovery scheme ("NAN discovery scheme"), and/or any other awareness networking and/or discovery scheme, e.g., as described below.

In some demonstrative embodiments, the awareness networking scheme, e.g., NAN, may enable applications to discover services in their close proximity. For example, the NAN technology may be a low power service discovery, which may, for example, scale efficiently, e.g., in dense Wi-Fi environments.

In some demonstrative embodiments, a device, e.g., wireless communication devices 102, 140, 160 and/or 180, may include one or more blocks and/or entities to perform network awareness functionality. For example, a device, e.g., devices 102, 140, 160 and/or 180, may be capable of performing the functionality of a NAN device, may include a NAN MAC and/or a Discovery Engine (DE). In one example, controllers 124 and/or 154 may be configured to perform the functionality of the discovery engine, and/or message processors 128 and/or 158 may be configured to perform the functionality of the NAN MAC, e.g., as described above. In another example, the functionality of the NAN MAC and/or the Discovery engine may be performed by any other element and/or entity of devices 102, 140, 160 and/or 180.

In some demonstrative embodiments, the awareness networking scheme may include a discovery scheme or protocol, e.g., as described below.

In some demonstrative embodiments, devices 102, 140, 160 and/or 180 may perform a discovery process according to the awareness networking scheme, for example, to discover each other and/or to establish a wireless communication link, e.g., directional and/or high throughput wireless communication link and/or any other link.

In some demonstrative embodiments, devices 102, 140, 160 and/or 180 may be configured to enable time synchronization between devices 102, 140, 160, 180 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 140, 160 and/or 180, so that STAs can find each other more efficiently during a DW.

In some demonstrative embodiments, devices of an awareness network, e.g., a NAN network, may form one or more clusters, e.g., in order to publish and/or subscribe for services. A NAN cluster may be defined by an Anchor Master (AM) (also referred to as a "NAN master device" or "anchor device"). In one example, the AM may include a NAN device, which has the highest rank in the NAN cluster.

In some demonstrative embodiments, NAN data exchange may be reflected by discovery frames, e.g., Publish, Subscribe and/or Follow-Up Service discovery frames (SDF). These frames may include action frames, which may be sent by a device that wishes to publish a service/application, and/or to subscribe to a published service/application at another end.

In one example, one of devices 102, 140, 160 and/or 180, e.g., device 102, may perform the functionality of an AM. The AM may be configured to transmit one or more beacons. Another one of devices 102, 140, 160 and/or 180, e.g., device 140, may be configured to receive and process the beacons.

In one example, devices 102, 140, 160 and/or 180 may perform the functionality of NAN devices, e.g., belonging to a NAN cluster, which may share a common set of NAN parameters, for example, including a common NAN timestamp, and/or a common time period between consecutive discovery windows (DWs). The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102, 140, 160 and/or 180 may be configured to discover one another over a predefined communication channel ("the social channel"). In one example, the Channel 6 in the 2.4 GHz band may be defined as the NAN social channel. Any other channel may be used as the social channel.

In some demonstrative embodiments, devices 102, 140, 160 and/or 180 may transmit discovery frames, e.g., SDFs, during the plurality of DWs, e.g., over the social channel. For example the NAN AM may advertize the time of the DW, during which NAN devices may exchange SDFs.

In one example, devices 102, 140, 160 and/or 180 may transmit the discovery frames to discover each other, for example, to enable using the one or more services provided by applications 125 and/or 126.

In some demonstrative embodiments, devices 102, 140, 160 and/or 180 may communicate during a DW according to a contention mechanism. For example, devices 102, 140, 160 and/or 180 may check whether or not a channel is unoccupied prior to an attempt to transmit a discovery frame during the discovery window.

In some demonstrative embodiments, a device of devices 102, 140, 160 and/or 180, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the discovery frame may not require an acknowledgement frame. According to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices of system 100 may utilize availability information, e.g., in the form of an Availability Interval Bitmap and/or Further Availability Map, for example, to allow a device of devices 102, 140, 160 and/or 180, to advertise its availability, for example, in terms of at least one channel and one or more timeslots, during which the device may be available, e.g., active ("awake"), for example, to perform post NAN activities.

In one example, the availability information may be communicated as part of an Availability Attribute, e.g., including a 32-bit bitmap for 32 timeslots, for example, wherein each timeslot is 16 milliseconds (ms) long. For example, each bit that is not zero may represent a timeslot, during which a device sending the Availability Attribute is to be awake and available to send and/or receive data in a specified method.

In some demonstrative embodiments, devices 102, 140, 160 and/or 180 may be configured to communicate according to a Wi-Fi Aware specification and/or any other awareness networking specification, which may be configured to allow a group of devices to discover other devices/services nearby and/or in close proximity, e.g., with low power.

In some demonstrative embodiments, devices 102, 140, 160 and/or 180 may form a NAN cluster 109 and may synchronize to the same clock, e.g., as described above.

In one example, all devices of the same cluster, e.g., NAN cluster 109, may converge on a time period and channel, e.g., a discovery window (DW), to facilitate the discovery of services of devices 102, 140, 160 and/or 180, and/or to achieve low power consumption, e.g., as described above.

In some demonstrative embodiments, devices 102, 140, 160 and/or 180 may perform a discovery procedure, for example, according to a Wi-Fi Aware specification and/or any other specification, before data transmission between devices 102, 140, 160 and/or 180.

In some demonstrative embodiments, devices 102, 140, 160 and/or 180 may be configured to enable data transmission for a specific service among multiple devices (also referred to as "Wi-Fi Aware data path"), post service discovery, e.g., after the discovery process.

In some demonstrative embodiments, after the discovery process, a set of devices of a NAN cluster, e.g., devices 102, 140, 160 and/or 180, which may transmit to each other may form a group, e.g., a data path group ("data group/data link group").

In some demonstrative embodiments, the term "group" may be used with respect to a plurality of devices, e.g., a set of devices, as described herein. In other embodiments, any other terminology may be used to refer to and/or identify the plurality of devices.

In some demonstrative embodiments, devices of the data path group may meet on fixed time periods and channels, which may be referred to as "timeblocks", to communicate with each other.

In some demonstrative embodiments, the time blocks may be based on and/or built on, a top of the discovery framework, e.g., the DWs, between devices 102, 140, 160 and/or 180.

In some demonstrative embodiments, devices 102, 140, 160 and/or 180 may be configured to build a data path group on top of the discovery framework between devices with active data links, e.g., as described below with reference to FIG. 2.

Figure 2:
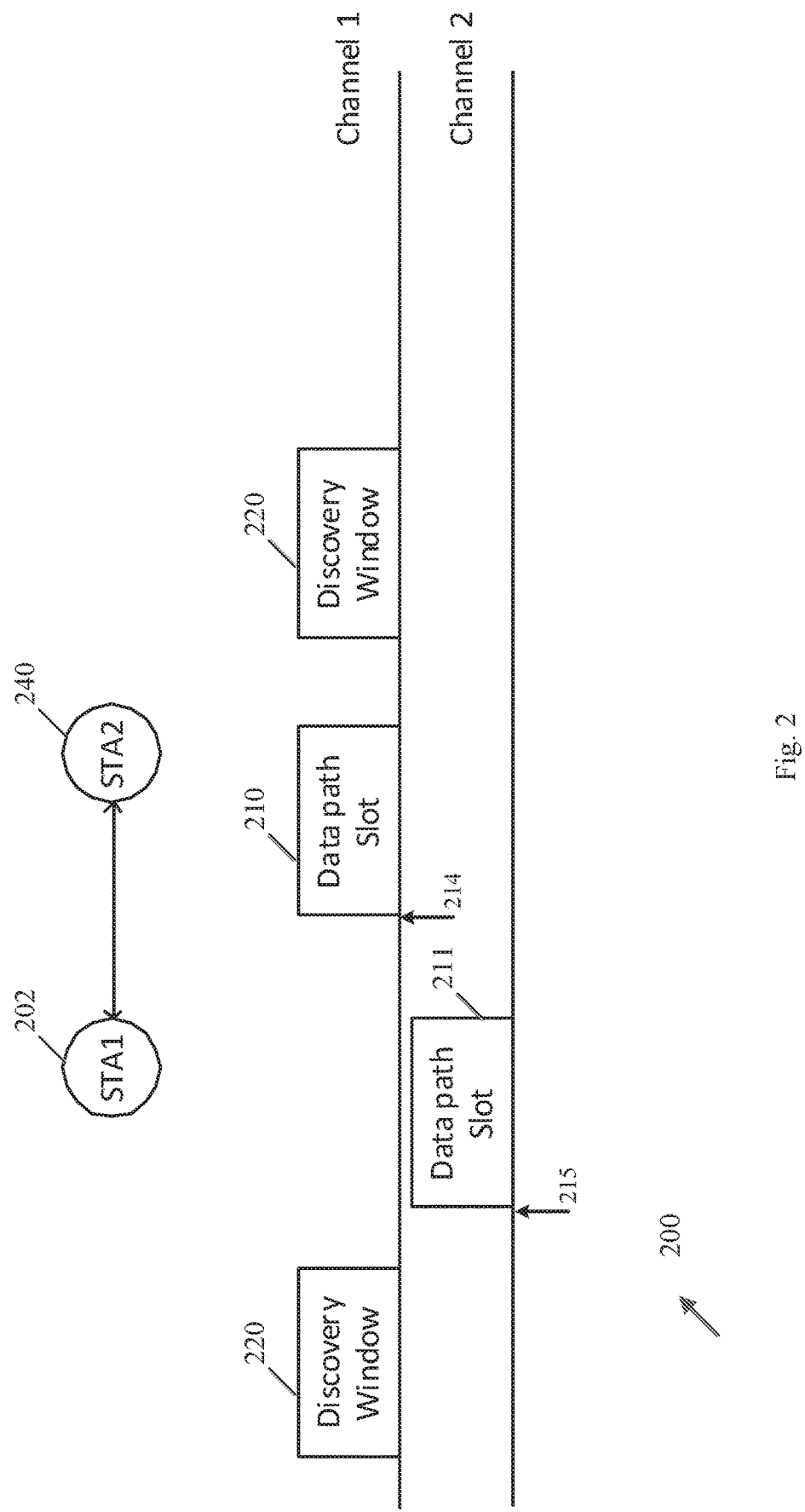
FIG. 2 is a schematic illustration of a communication scheme between a first station and a second station in a data path group, in accordance with some demonstrative embodiments.

Reference is made to FIG. 2, which schematically illustrates a communication scheme 200 between a first station 202 and a second station 240 in a data path group, in accordance with some demonstrative embodiments. For example, station 202 may perform the functionality of device 102 (FIG. 1); and/or station 240 may perform the functionality of one of devices 140, 160 and/or 180 (FIG. 1).

As shown in FIG. 2, time blocks 210 and/or 211 of the data path group may be built on a discovery framework between stations 202 and 240 including one or more discovery windows 220.

As shown in FIG. 2, time block 210 may be scheduled to begin at time 214 over a first channel, denoted channel 1, at a specific time. For example, time block 211 may be scheduled to begin at time 215 over a second channel, denoted Channel 2.

Referring back to FIG. 1, in some demonstrative embodiments, scheduling the time blocks, e.g., time blocks 210 and/or 211 (FIG. 2), may require considering different requirements, e.g., as described below.

In some demonstrative embodiments, there may be a plurality of different topologies and/or a plurality of different schedule requirements to be considered, for example, when building a data path group, which may be built to provide available time slots, or schedules, between devices with active data links.

In some demonstrative embodiments, a topology of a data path group may include the structure, the arrangement, and/or the data flow between devices of the data path group. For example, the topology may include the topological structure of the data path group.

In some demonstrative embodiments, designing a general scheduling algorithm, and/or mixing schedules for different topologies may lead to a complexity, e.g., associated with maintaining different scheduling constraints for different topologies.

In some demonstrative embodiments, a plurality of different data path topologies may be identified and/or defined, for example, with respect to a plurality of use cases. For example, one or more data path topologies may be identified and/or defined, for example, with respect to one or more important use cases, for example, including one or more important NAN use cases, e.g., in accordance with a NAN Specification, e.g., a NAN 2.0 Specification, and/or any other Specification.

In some demonstrative embodiments, devices 102, 140, 160 and/or 180 may be configured to create and/or communicate in a data path group based on a specific data path topology, e.g., as described below.

In some demonstrative embodiments, devices 102, 140, 160 and/or 180 may be configured to communicate in the data path group according to a scheduling algorithm, which may be, for example, based on the data path topology, e.g., as described below.

In some demonstrative embodiments, data path groups may be defined and/or created for different topologies. For example, a data path group with a specific topology may be configured to have a schedule, e.g., as described below.

In some demonstrative embodiments, a service may utilize an existing data path group and/or topology, e.g., as described below.

In some demonstrative embodiments, a scheduling algorithm and/or schedules for a data path group with a specific topology may be designed separately, e.g., to meet one or more requirements of the data path group, e.g., as described below.

In some demonstrative embodiments, devices 102, 140, 160 and/or 180 may be configured to communicate according to one or more predefined topologies, for example, including one or more of the topologies described below, and/or one or more other additional or alternative topologies.

In some demonstrative embodiments, devices 102, 140, 160 and/or 180 may be configured to communicate with one or more NAN devices of at least one data path group having a data path topology according to a scheduling scheme corresponding to the data path topology.

In some demonstrative embodiments, the data path group may include two or more NAN devices of the NAN cluster 109.

In one example, devices 102, 140, 160 and/or 180 may belong to a data path group having a data path topology. According to this example, a device of devices 102, 140, 160 and/or 180, e.g., device 102, may be configured to communicate with devices 140, 160 and/or 180 according to a scheduling scheme corresponding to the data path topology, e.g., as described below.

In some demonstrative embodiments, controller 124 may be configured to control, cause and/or trigger device 102 to communicate with devices 140, 160 and/or 180 according to the scheduling scheme corresponding to the data path topology of the data path group.

In some demonstrative embodiments, the scheduling scheme may include a combination of channel and time resources.

In some demonstrative embodiments, at least three topologies may be identified, for example, based on at least three use cases, e.g., based on at least three NAN 2.0 use cases, e.g., as described below.

In other embodiments, any other additional or alternative topologies may be identified and/or defined, based, for example, on any other use cases, scenarios, and/or implementations, for example, in accordance with a NAN Specification and/or any other Specification.

In some demonstrative embodiments, the data path topology may include a fully connected topology (also referred to as "Topology 1"), a one-to-many topology (also referred to as "Topology 2"), or a one-to-one topology (also referred to as "Topology 3"), e.g., as described below. In other embodiments, the data path topology may include any other topology.

In some demonstrative embodiments, the data path topology may include the fully connected topology.

In some demonstrative embodiments, the fully connected topology may include a topology, in which each device of the data path group may be configured to directly communicate with each other device of the data path group.

In some demonstrative embodiments, a scheduling scheme, e.g., corresponding to the fully connected topology, may include a common schedule for all devices of the data path group.

In one example, devices 102, 140, 160 and/or 180 may belong to a data path group having the fully connected topology. According to this example, each device of devices 102, 140, 160 and/or 180 may be configured to directly communicate with each other device of devices 102, 140, 160 and/or 180 according to a common schedule, e.g., as described below with reference to FIG. 3.

Figure 3:
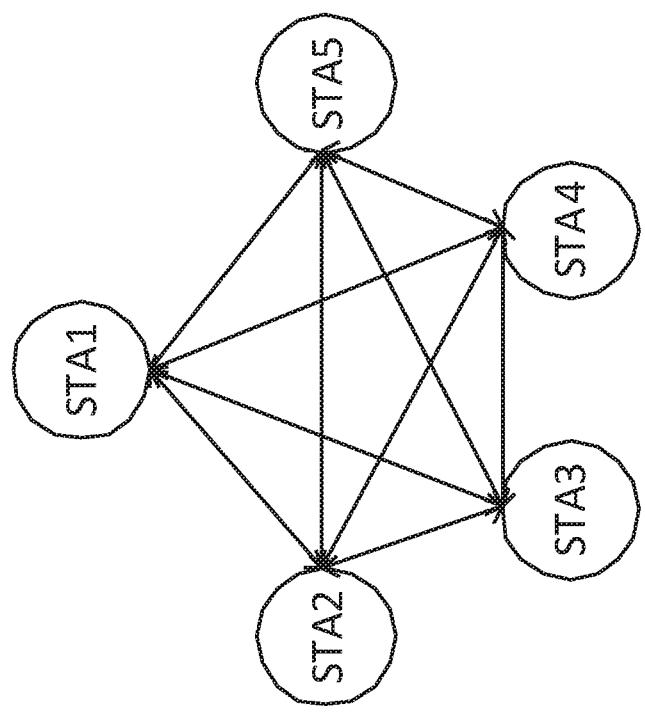
FIG. 3 is a schematic illustration of a data path topology, in accordance with some demonstrative embodiments.

Reference is made to FIG. 3, which schematically illustrates a data path topology 300 of a data path group, in accordance with some demonstrative embodiments.

In one example, devices 102, 140, 160 and/or 180 (FIG. 1) may be configured to form, and/or communicate as part of, the data path group according to data path topology 300.

As shown in FIG. 3, data path topology 300 may include the fully connected topology.

In some demonstrative embodiments, data path topology 300 may be configured, for example, to fully connect devices with data links, e.g., such that a device, e.g., each device, of the data path group may be able to connect with each other device of the data path group, e.g., directly.

In one example, data path topology 300 may be implemented, for example, for an application or service, e.g., a gaming application, in which devices of a data path group may be required to communicate with everyone else, e.g., to play a game and/or to perform any other operations.

Referring back to FIG. 1, in some demonstrative embodiments, 102 devices 140, 160, and/or 180 may be configured to communicate according to the one-to-many topology.

In some demonstrative embodiments, the one-to-many topology may include a topology, in which a source device of the data path group is to directly communicate with each other device of the data path group.

In some demonstrative embodiments, a scheduling scheme, e.g., corresponding to the one-to-many topology, may include a common schedule for all devices of the data path group.

In one example, devices 102, 140, 160 and/or 180 may belong to a data path group having the one-to-many topology. According to this example, a source device of devices 102, 140, 160 and/or 180, e.g., device 102, may be configured to directly communicate with one or more other devices, e.g., devices 140, 160 and/or 180, according to a common schedule, e.g., as described below with reference to FIG. 4.

Figure 4:
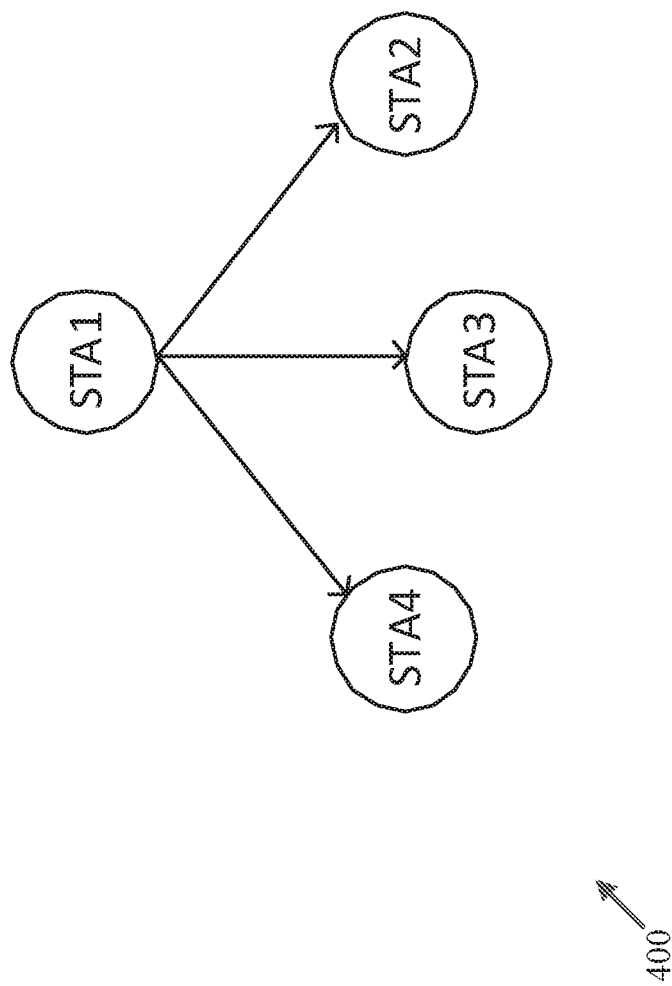
FIG. 4 is a schematic illustration of a data path topology, in accordance with some demonstrative embodiments.

Reference is made to FIG. 4, which schematically illustrates a data path topology 400 of a data path group, in accordance with some demonstrative embodiments.

In one example, devices 102, 140, 160 and/or 180 (FIG. 1) may be configured to form, and/or communicate as part of, the data path group according to data path topology 400.

As shown in FIG. 4, data path topology 400 may include the one-to-many topology.

In some demonstrative embodiments, data path topology 400 may be configured, for example, to provide a one-to-many connection between devices with data links, for example, such that a device of the data path group may be able to communicate directly with each other device of the data path group, for example, while one or more other devices of the data path group may not be connected directly to one or more other devices of the data path group.

In one example, data path topology 400 may be implemented, for example, for an application or service, e.g., a gaming application, in which a source device, e.g., a STA1 as shown in FIG. 4, may be configured to distribute data, for example, music or video, to several other devices, e.g., simultaneously.

Referring back to FIG. 1, in some demonstrative embodiments, 102 devices 140, 160, and/or 180 may be configured to communicate according to the one-to-one topology.

In some demonstrative embodiments, the one-to-one topology may include a topology, in which one or more pairs of devices are to communicate over one or more respective one-to-one data links.

In some demonstrative embodiments, a scheduling scheme, e.g., corresponding to the one-to-one topology, may include a common schedule for a pair of devices, e.g., of the one or more pairs.

In one example, devices 102, 140, 160 and/or 180 may belong to a data path group having the one-to-one topology. According to this example, a pair of devices, e.g., devices 102 and 140, having a direct data link between the pair of devices may be configured to communicate according to a common schedule, e.g., as described below with reference to FIG. 5.

Figure 5:
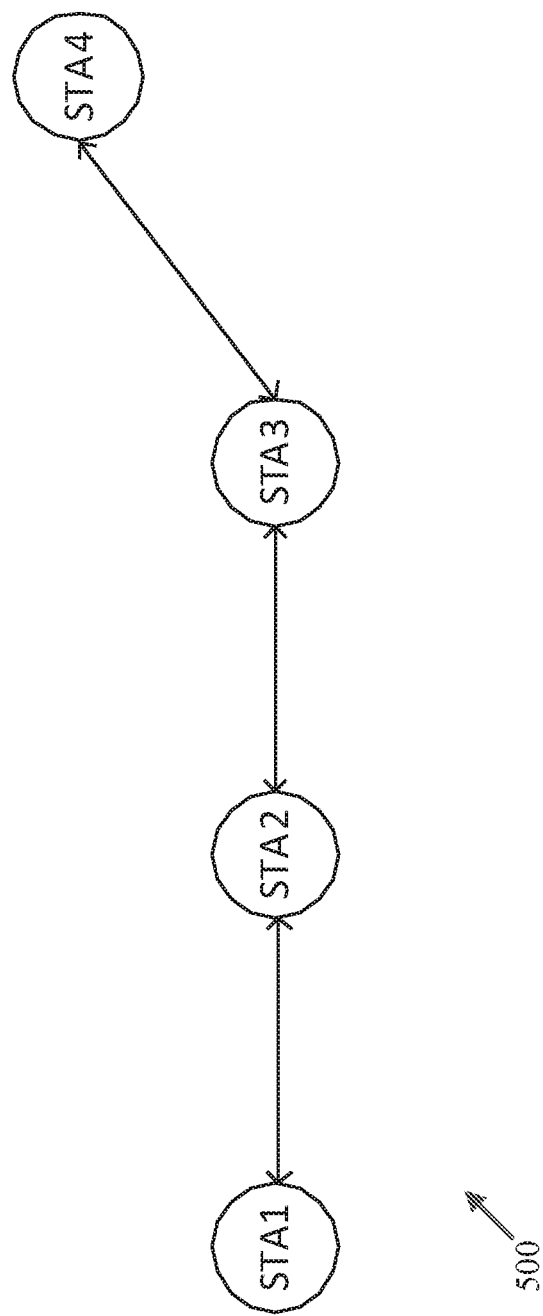
FIG. 5 is a schematic illustration of a data path topology, in accordance with some demonstrative embodiments.

Reference is made to FIG. 5, which schematically illustrates a data path topology 500 of a data path group, in accordance with some demonstrative embodiments.

In one example, devices 102, 140, 160 and/or 180 (FIG. 1) may be configured to form, and/or communicate as part of, the data path group according to data path topology 500.

As shown in FIG. 5, data path topology 500 may include the one-to-many topology.

In some demonstrative embodiments, data path topology 500 may be configured, for example, to provide one or more combinations of many one-to-one data links.

In some demonstrative embodiments, data path topology 500 may be configured, for example, to provide one or more one-to-one connections between one or more pairs of devices.

In some demonstrative embodiments, data path topology 500 may be implemented, for example, for an application or service, e.g., a chatting application, a home appliance control application, and/or any other service, which may utilize a one-to-one connection between devices.

Referring back to FIG. 1, in some demonstrative embodiments, different topologies may have different scheduling requirements, e.g., as described below.

In some demonstrative embodiments, data path topology 300 (FIG. 3) and/or data path topology 400 (FIG. 4) may utilize a common schedule for all devices, e.g., as described above.

In some demonstrative embodiments, a device of a data path group, e.g., device 102, may be responsible for creating and/or maintaining the common schedules of the data path group, e.g., according to data path topology 300 (FIG. 3) and/or data path topology 400 (FIG. 4).

In some demonstrative embodiments, a source device, e.g., a device 102, for example, a device from which data is to be provided to other devices in the data path group, may be configured to create and/or maintain the schedule, e.g., according to data path topology 400 (FIG. 4).

In some demonstrative embodiments, a common schedule may be configured between two devices with a data link, e.g., according to data path topology 500 (FIG. 5).

In some demonstrative embodiments, a device, e.g., device 102, may be allowed to merge schedules among its peers with data links, e.g., according to data path topology 500 (FIG. 5). However, there may be no need for all devices to share the same schedule, e.g., according to data path topology 500 (FIG. 5).

In some demonstrative embodiments, devices 102, 140, 160 and/or 180 may be configured to form one or more groups, for example, based on one or more topologies, e.g., based on one or more of the data path topologies of FIGS. 3, 4, and/or 5, and/or one or more other topologies, e.g., as described below.

In some demonstrative embodiments, a device of devices 102, 140, 160 and/or 180, e.g., device 102, may be configured to create, set up and/or form one or more groups for data links, e.g., according to a specific topology, e.g., based on one or more criteria and/or requirements.

In some demonstrative embodiments, controller 124 may be configured to control, cause and/or trigger device 102 to form the data path group based on the data path topology.

In some demonstrative embodiments, controller 124 may be configured to control, cause and/or trigger device 102 to determine the scheduling scheme for the data path group according to the data path topology.

In some demonstrative embodiments, controller 124 may be configured to control, cause and/or trigger device 102 to determine the data path topology based on one or more attributes of a service to be provided to the data path group.

In one example, a device performing the functionality of a video sharing source, e.g., device 102, may create a group having data path topology 400 (FIG. 4), e.g., the one-to-many topology.

In another example, a device performing the functionality of a game initiator, e.g., device 102, may create a group having data path topology 300 (FIG. 3), e.g., the fully-connected topology.

In some demonstrative embodiments, a topology to be used for a group may be decided, for example, by a service that requests for the creation of the data links for the group.

In some demonstrative embodiments, controller 124 may be configured to control, cause and/or trigger device 102 to receive an indication of the data path topology from a service to be provided to the data path group.

In some demonstrative embodiments, controller 124 may be configured to control, cause and/or trigger device 102 to form the data path group based on the indication of the data path topology.

In one example, a data path group may be configured to provide services of application 125, e.g., a video sharing application, to devices of the data path group. According to this example, application 125 may send to controller 124 an indication of the one-to many topology, and controller 124 may form the data path group to provide the services of application 125 according to the one-to many topology.

In some demonstrative embodiments, a default topology, for example, data path topology 400 (FIG. 4), or any other topology, may be used, for example, if a service does not specify a specific topology.

In some demonstrative embodiments, a topology indication may be received from a device NAN engine, e.g., controller 124, for example, instead of from the service. In one example, the NAN engine may start a multicast topology/group. In another example, the NAN engine may start a fully connected topology/group as an initiator.

In some demonstrative embodiments, a data path group may only have one topology.

In some demonstrative embodiments, a data path group may be assigned a group identifier (ID), which may be configured, for example, to differentiate between data path groups having the same topology.

In one example, two video sharing sources, e.g., applications 125 and 145, using the same topology, e.g., data path topology 400 (FIG. 4), may belong to two different data path groups having two different group IDs, respectively.

In some demonstrative embodiments, a topology index may be associated with a group ID of a group, e.g., to identify a topology being implemented by the group.

In one example, the values 1, 2, and/or 3 may be used as topology indexes to represent the data path topology 300 (FIG. 3), data path topology 400 (FIG. 4), and/or data path topology 500 (FIG. 5), respectively.

In some demonstrative embodiments, a service may utilize an existing data path group and/or a data path topology to create data links, e.g., between devices of the data path group.

In some demonstrative embodiments, multiple services may exist in one data path group having a specific topology.

For example, applications 125 and 126 may include two different game applications. According to this example, a data path group including devices 102, 140 and/or 160, may have the fully connected topology to provide services from applications 125 and 126 to devices 102, 140 and/or 160.

In some demonstrative embodiments, a device of devices 102, 140, 160 and/or 180 may belong to two different groups.

In one example, the device may be in a video chatting group, a voice chatting group, and/or any other group, e.g., simultaneously.

In some demonstrative embodiments, the device may have different schedules for the two different groups.

In some demonstrative embodiments, controller 124 may be configured to control, cause and/or trigger device 102 to communicate with one or more first NAN devices of a first data path group having a first data path topology according to a first schedule, and to communicate with one or more second NAN devices of a second data path group having a second data path topology according to a second schedule.

In some demonstrative embodiments, the second schedule may be different from the first schedule.

In one example, device 102 may communicate with devices 140 and 160 of a first data path group having a first data path topology according to a first schedule, and to communicate with device 180 of a second data path group having a second data path topology according to a second schedule different from the first schedule.

In some demonstrative embodiments, a device of devices 102, 140, 160 and/or 180 may be configured to merge schedules.

In some demonstrative embodiments, ranks may be assigned to devices, for example, to enable quick merging between the schedules.

For example, different ranks may be assigned to different devices, e.g., to enable the devices to merge schedules quickly and/or minimize the time to stay awake. In other embodiments, the schedules may be merged based on any other additional or alternative criterion. Some demonstrative embodiments may include a procedure or algorithm of adjusting and/or merging schedules of stations, for example, based on the rank of neighboring devices.

In some demonstrative embodiments, two or more different groups, e.g., having the same topology, may merge.

In one example, a first data path group having the data path topology 400 (FIG. 4) and including a device A, a device B, and a device C, may merge with a second data path group having the data path topology 400 (FIG. 4) and including the devices A, B, and C, and a device D.

In another example, a first group having data path topology 500 (FIG. 5) and including a device A, and a device B, may merge with a second data path group having data path topology 500 (FIG. 5) and including the device B, and a device C.

In some demonstrative embodiments, controller 124 may be configured to control, cause and/or trigger device 102 to merge a first data path group including a first plurality of NAN devices and a second data path group including a second plurality of NAN devices into a third data path group including the first and second pluralities of NAN devices. For example, the first, second and third data path groups may have the same data path topology.

In one example, controller 124 may be configured to control, cause and/or trigger device 102 to merge a first data path group including devices 102, 140 and 160, and a second data path group including devices 102, 140 and 180 into a third data path group including devices 102, 140, 160 and 180. According to this example, the first, second and third data path groups may the same data path topology, e.g., the one-to-many topology.

In some demonstrative embodiments, different scheduling algorithms may be used, for example, to schedule communications within groups having different topologies.

In some demonstrative embodiments, data path groups having the fully connected network topology, e.g., data path topology 300 (FIG. 3), or a one-to-many topology, e.g., data path topology 400 (FIG. 4), may maintain a common schedule by a coordinator.

In some demonstrative embodiments, devices of a group using a one-to-one network topology, e.g., data path topology 500 (FIG. 5), may manage a schedule, for example, based on schedules of the devices.

In some demonstrative embodiments, a device of devices 102, 140, 160 and/or 180 may be configured to announce the data path topology.

In some demonstrative embodiments, topology information of the data path topology may be included in an attribute of a message.

In some demonstrative embodiments, a device of devices 102, 140, 160 and/or 180, e.g., device 102, may be configured to transmit the message including the topology information.

In some demonstrative embodiments, controller 124 may be configured to control, cause and/or trigger device 102 to transmit a message including topology information corresponding to the data path topology.

In some demonstrative embodiments, controller 124 may be configured to control, cause and/or trigger message processor 128 to generate the message, and transmitter 118 to transmit the message.

In some demonstrative embodiments, the message may include a service discovery frame or a NAN management frame.

In some demonstrative embodiments, the topology information may include topology type information to indicate a type of the data path topology, a group identifier (ID) to identify the data path group, schedule information to indicate a schedule of the data path group, and/or an indication of a controller of the data path group.

In other embodiments, the topology information may include any other additional and/or alternative information with respect to the data path topology and/or any other information.

In some demonstrative embodiments, the topology type may indicate the fully connected topology, the one to many topology, or the one-to-one topology.

In some demonstrative embodiments, the topology type information may include a first index value to indicate the fully connected topology, a second index value to indicate the one-to-many topology, or a third index value to indicate the one-to-one topology.

In other embodiments, the topology type may indicate, represent and/or include any other topology.

In some demonstrative embodiments, the message may include an attribute ID field to identify the message as a topology attribute message, e.g., as described below.

In some demonstrative embodiments, the message may include a topology index field including the topology type information, e.g., as described below.

In some demonstrative embodiments, the message may be configured to include topology type information of different topology types.

In some demonstrative embodiments, a general attribute may be configured to be used with respect to a plurality of different topology types. In one example, the general attribute may include one or more fields, e.g., as follows:

TABLE 1

| Field | Size (Octets) | Value (Hex) | Description |
| --- | --- | --- | --- |
| Attribute ID | 1 | Variable | Identifies general topology attribute |
| Length | 2 | Variable | Length of the following fields in the attribute |
| Topology Index | TBD | TBD | Indicate the type of topology |
| Group Id | TBD | TBD | Indicate the id of the group with the topology. May be called in a different name. |
| Schedules | TBD | TBD | Indicate the schedule of the group |
| Source/Anchor | | | Source is for Topology 2. Anchor is for Topology 1. Source or Anchor represents a single point of control |

As shown in Table 1, the general attribute may include an attribute identifier (ID) to indicate that the attribute is a general topology attribute, e.g., configured to signal topology information of a topology selected from a plurality of topologies.

As shown in Table 1, the general attribute may include the topology index field to indicate a type of a topology to which the attribute refers, for example, to enable to differentiate between the different topology types.

In some demonstrative embodiments, the message may be configured to include topology type information of a specific topology type. For example, one or more, e.g., a plurality of, different specific attributes may be defined corresponding to one or more, e.g., a plurality of, respective of topology types, e.g., as described below.

In some demonstrative embodiments, a specific attribute may be configured with respect to a specific topology type. In one example, the specific attribute may include one or more fields, e.g., as follows:

TABLE 2

| Field | Size (Octets) | Value (Hex) | Description |
| --- | --- | --- | --- |
| Attribute ID | 1 | Variable | Indicate the attribute for a specific topology |
| Length | 2 | Variable | Length of the following fields in the attribute |
| Group Id | TBD | TBD | Indicate the id of the group with the topology. May be called in a different name. |
| Schedules | TBD | TBD | Indicate the schedule of the group |
| Source/Anchor | | | Source is for topology 2. Anchor is for topology 1. Source or Anchor may be called different name, but represents a single point of control for the group. |

As shown in Table 2, the specific attribute may include the Attribute ID field to indicate a topology type to which the specific attribute refers, for example, to enable to differentiate between the different topology types.

For example, a first specific attribute may be configured for a fully connected topology, a second specific attribute may be configured for a one-to-many topology, a third specific attribute may be configured for a one-to-one topology, and/or any other additional or alternative specific attribute may be configured for any other additional or alternative topology.

Figure 6:
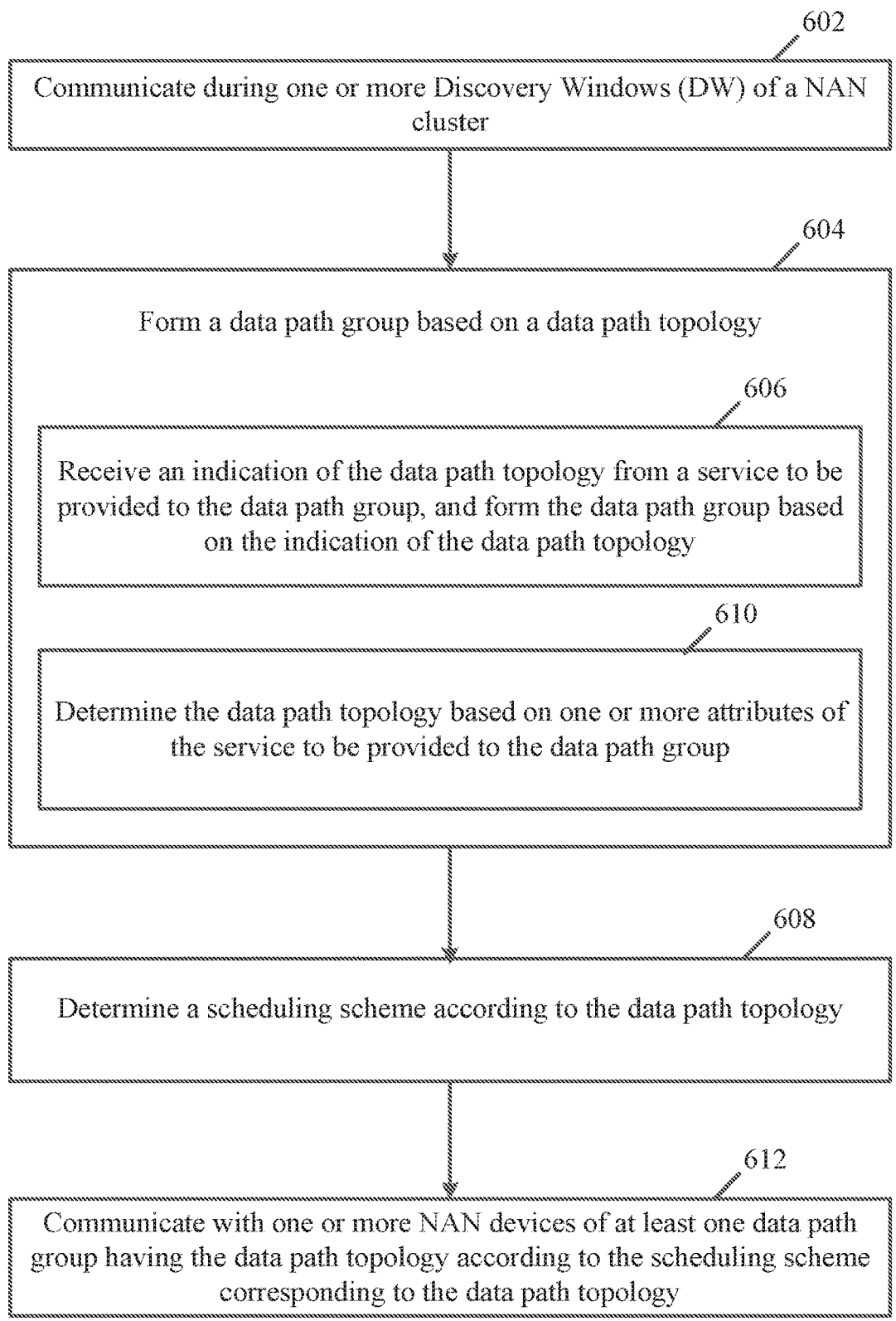
FIG. 6 is a schematic flow-chart illustration of a method of communicating in a data path group, in accordance with some demonstrative embodiments.

Reference is made to FIG. 6, which schematically illustrates a method of communicating in data path group, in accordance with some demonstrative embodiments. For example, one or more of the operation of FIG. 6 may be performed by one or more elements of a system, e.g., system 100 (FIG. 1); a device, e.g., wireless communication devices 102, 140, 160 and/or 180 (FIG. 1); a controller, e.g., controller 124 (FIG. 1), and/or controller 154 (FIG. 1); a radio, e.g., radio 114 (FIG. 1), and/or radio 144 (FIG. 1); and/or a message processor, e.g., message processor 128 (FIG. 1) and/or message processor 158 (FIG. 1).

As indicated at block 602, the method may include communicating during one or more Discovery Windows (DWs) of a NAN cluster. For example, controller 124 (FIG. 1) may control, cause and/or trigger device 102 (FIG. 1) to communicate during DWs 220 (FIG. 2) of NAN cluster 109 (FIG. 1), e.g., as described above.

As indicated at block 604, the method may include forming a data path group based on a data path topology. For example, controller 124 (FIG. 1) may control, cause and/or trigger device 102 (FIG. 1) to form the data path group based on the data path topology, e.g., as described above.

As indicated at block 606, forming the data path group may include receiving an indication of the data path topology from a service to be provided to the data path group, and forming the data path group based on the indication. For example, controller 124 (FIG. 1) may control, cause and/or trigger device 102 (FIG. 1) to receive the indication of the data path topology from application 125 (FIG. 1), and to form the data path group based on the indication, e.g., as described above.

As indicated at block 608, forming the data path group may include determining the data path topology based on one or more attributes of a service to be provided to the data path group. For example, controller 124 (FIG. 1) may determine the data path topology based on one or more attributes of application 125 (FIG. 1) to be provided to the data path group, e.g., as described above.

As indicated at block 610, the method may include determining a scheduling scheme according to the data path topology. For example, controller 124 (FIG. 1) may determine the scheduling scheme according to the data path topology, e.g., as described above.

As indicated at block 612, the method may include communicating with one or more NAN devices of at least one data path group having a data path topology according to a scheduling scheme corresponding to the data path topology. For example, controller 124 (FIG. 1) may control, cause and/or trigger device 102 (FIG. 1) to communicate with devices 140, 160 and/or 180 (FIG. 1) of the data path group having the data path topology according to the scheduling scheme, e.g., as described above.

Figure 7:
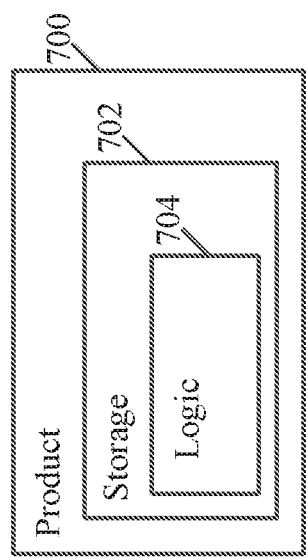
FIG. 7 is a schematic illustration of a product, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of devices 102, 140, 160 and/or 180 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), and/or to perform one or more operations and/or functionalities of the FIGS. 2, 3, 4, 5, and/or 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 comprises an apparatus comprising logic and circuitry configured to cause a Neighbor Awareness Networking (NAN) device to communicate during one or more Discovery Windows (DW) of a NAN cluster; and communicate with one or more NAN devices of at least one data path group having a data path topology according to a scheduling scheme corresponding to the data path topology, the data path group comprising two or more NAN devices of the NAN cluster.

Example 2 includes the subject matter of Example 1, and optionally, wherein the data path topology comprises a fully connected topology, in which each device of the data path group is to directly communicate with each other device of the data path group.

Example 3 includes the subject matter of Example 2, and optionally, wherein the scheduling scheme comprises a common schedule for all devices of the data path group.

Example 4 includes the subject matter of Example 1, and optionally, wherein the data path topology comprises a one-to-many topology, in which a source device of the data path group is to directly communicate with each other device of the data path group.

Example 5 includes the subject matter of Example 4, and optionally, wherein the scheduling scheme comprises a common schedule for all devices of the data path group.

Example 6 includes the subject matter of Example 1, and optionally, wherein the data path topology comprises a one-to-one topology, in which one or more pairs of devices are to communicate over one or more respective one-to-one data links.

Example 7 includes the subject matter of Example 6, and optionally, wherein the scheduling scheme comprises a common schedule for a pair of devices.

Example 8 includes the subject matter of any one of Examples 1-7, and optionally, configured to cause the NAN device to communicate with one or more first NAN devices of a first data path group having a first data path topology according to a first schedule, and to communicate with one or more second NAN devices of a second data path group having a second data path topology according to a second schedule.

Example 9 includes the subject matter of Example 8, and optionally, wherein the second data path topology is different from the first data path topology.

Example 10 includes the subject matter of Example 8 or 9, and optionally, wherein the second schedule is different from the first schedule.

Example 11 includes the subject matter of any one of Examples 1-10, and optionally, configured to cause the NAN device to form the data path group based on the data path topology, and to determine the scheduling scheme according to the data path topology.

Example 12 includes the subject matter of any one of Examples 1-11, and optionally, configured to cause the NAN device to transmit a message comprising topology information corresponding to the data path topology.

Example 13 includes the subject matter of Example 12, and optionally, wherein the topology information comprises topology type information to indicate a type of the data path topology, a group identifier (ID) to identify the data path group, schedule information to indicate a schedule of the data path group, and an indication of a controller of the data path group.

Example 14 includes the subject matter of Example 13, and optionally, wherein the message comprises a topology index field comprising the topology type information.

Example 15 includes the subject matter of Example 13 or 14, and optionally, wherein the message comprises an attribute ID field comprising the topology type information.

Example 16 includes the subject matter of any one of Examples 13-15, and optionally, wherein the topology type information comprises a first index value to indicate a fully connected topology, a second index value to indicate a one-to-many topology, or a third index value to indicate one-to-one topology.

Example 17 includes the subject matter of any one of Examples 12-16, and optionally, wherein the message comprises a service discovery frame or a NAN management frame.

Example 18 includes the subject matter of any one of Examples 1-17, and optionally, configured to cause the NAN device to merge a first data path group comprising a first plurality of NAN devices and a second data path group comprising a second plurality of NAN devices into a third data path group comprising the first and second pluralities of NAN devices, the first, second and third data path groups all having the same data path topology.

Example 19 includes the subject matter of any one of Examples 1-18, and optionally, configured to cause the NAN device to receive an indication of the data path topology from a service to be provided to the data path group, and to form the data path group based on the indication of the data path topology.

Example 20 includes the subject matter of any one of Examples 1-19, and optionally, configured to cause the NAN device to determine the data path topology based on one or more attributes of a service to be provided to the data path group.

Example 21 includes the subject matter of any one of Examples 1-20, and optionally, wherein the scheduling scheme comprises a combination of channel and time resources.

Example 22 includes the subject matter of any one of Examples 1-21, and optionally, comprising one or more antennas, a memory, and a processor.

Example 23 comprises a system of wireless communication comprising a Neighbor Awareness Networking (NAN) device, the NAN device comprising one or more antennas; a memory; a processor; and a controller configured to cause the NAN device to communicate during one or more Discovery Windows (DW) of a NAN cluster, and to communicate with one or more NAN devices of at least one data path group having a data path topology according to a scheduling scheme corresponding to the data path topology, the data path group comprising two or more NAN devices of the NAN cluster.

Example 24 includes the subject matter of Example 23, and optionally, wherein the data path topology comprises a fully connected topology, in which each device of the data path group is to directly communicate with each other device of the data path group.

Example 25 includes the subject matter of Example 24, and optionally, wherein the scheduling scheme comprises a common schedule for all devices of the data path group.

Example 26 includes the subject matter of Example 23, and optionally, wherein the data path topology comprises a one-to-many topology, in which a source device of the data path group is to directly communicate with each other device of the data path group.

Example 27 includes the subject matter of Example 26, and optionally, wherein the scheduling scheme comprises a common schedule for all devices of the data path group.

Example 28 includes the subject matter of Example 23, and optionally, wherein the data path topology comprises a one-to-one topology, in which one or more pairs of devices are to communicate over one or more respective one-to-one data links.

Example 29 includes the subject matter of Example 28, and optionally, wherein the scheduling scheme comprises a common schedule for a pair of devices.

Example 30 includes the subject matter of any one of Examples 23-29, and optionally, wherein the controller is configured to cause the NAN device to communicate with one or more first NAN devices of a first data path group having a first data path topology according to a first schedule, and to communicate with one or more second NAN devices of a second data path group having a second data path topology according to a second schedule.

Example 31 includes the subject matter of Example 30, and optionally, wherein the second data path topology is different from the first data path topology.

Example 32 includes the subject matter of Example 30 or 31, and optionally, wherein the second schedule is different from the first schedule.

Example 33 includes the subject matter of any one of Examples 23-32, and optionally, wherein the controller is configured to cause the NAN device to form the data path group based on the data path topology, and to determine the scheduling scheme according to the data path topology.

Example 34 includes the subject matter of any one of Examples 23-33, and optionally, wherein the controller is configured to cause the NAN device to transmit a message comprising topology information corresponding to the data path topology.

Example 35 includes the subject matter of Example 34, and optionally, wherein the topology information comprises topology type information to indicate a type of the data path topology, a group identifier (ID) to identify the data path group, schedule information to indicate a schedule of the data path group, and an indication of the controller of the data path group.

Example 36 includes the subject matter of Example 35, and optionally, wherein the message comprises a topology index field comprising the topology type information.

Example 37 includes the subject matter of Example 35 or 36, and optionally, wherein the message comprises an attribute ID field comprising the topology type information.

Example 38 includes the subject matter of any one of Examples 35-37, and optionally, wherein the topology type information comprises a first index value to indicate a fully connected topology, a second index value to indicate a one-to-many topology, or a third index value to indicate one-to-one topology.

Example 39 includes the subject matter of any one of Examples 34-38, and optionally, wherein the message comprises a service discovery frame or a NAN management frame.

Example 40 includes the subject matter of any one of Examples 23-39, and optionally, wherein the controller is configured to cause the NAN device to merge a first data path group comprising a first plurality of NAN devices and a second data path group comprising a second plurality of NAN devices into a third data path group comprising the first and second pluralities of NAN devices, the first, second and third data path groups all having the same data path topology.

Example 41 includes the subject matter of any one of Examples 23-40, and optionally, wherein the controller is configured to cause the NAN device to receive an indication of the data path topology from a service to be provided to the data path group, and to form the data path group based on the indication of the data path topology.

Example 42 includes the subject matter of any one of Examples 23-41, and optionally, wherein the controller is configured to cause the NAN device to determine the data path topology based on one or more attributes of a service to be provided to the data path group.

Example 43 includes the subject matter of any one of Examples 23-42, and optionally, wherein the scheduling scheme comprises a combination of channel and time resources.

Example 44 comprises a method to be performed at a Neighbor Awareness Networking (NAN) device, the method comprising communicating during one or more Discovery Windows (DW) of a NAN cluster; and communicating with one or more NAN devices of at least one data path group having a data path topology according to a scheduling scheme corresponding to the data path topology, the data path group comprising two or more NAN devices of the NAN cluster.

Example 45 includes the subject matter of Example 44, and optionally, wherein the data path topology comprises a fully connected topology, in which each device of the data path group is to directly communicate with each other device of the data path group.

Example 46 includes the subject matter of Example 45, and optionally, wherein the scheduling scheme comprises a common schedule for all devices of the data path group.

Example 47 includes the subject matter of Example 44, and optionally, wherein the data path topology comprises a one-to-many topology, in which a source device of the data path group is to directly communicate with each other device of the data path group.

Example 48 includes the subject matter of Example 47, and optionally, wherein the scheduling scheme comprises a common schedule for all devices of the data path group.

Example 49 includes the subject matter of Example 44, and optionally, wherein the data path topology comprises a one-to-one topology, in which one or more pairs of devices are to communicate over one or more respective one-to-one data links.

Example 50 includes the subject matter of Example 49, and optionally, wherein the scheduling scheme comprises a common schedule for a pair of devices.

Example 51 includes the subject matter of any one of Examples 44-50, and optionally, comprising communicating with one or more first NAN devices of a first data path group having a first data path topology according to a first schedule, and communicating with one or more second NAN devices of a second data path group having a second data path topology according to a second schedule.

Example 52 includes the subject matter of Example 51, and optionally, wherein the second data path topology is different from the first data path topology.

Example 53 includes the subject matter of Example 51 or 52, and optionally, wherein the second schedule is different from the first schedule.

Example 54 includes the subject matter of any one of Examples 44-53, and optionally, comprising forming the data path group based on the data path topology, and determining the scheduling scheme according to the data path topology.

Example 55 includes the subject matter of any one of Examples 44-54, and optionally, comprising transmitting a message comprising topology information corresponding to the data path topology.

Example 56 includes the subject matter of Example 55, and optionally, wherein the topology information comprises topology type information to indicate a type of the data path topology, a group identifier (ID) to identify the data path group, schedule information to indicate a schedule of the data path group, and an indication of a controller of the data path group.

Example 57 includes the subject matter of Example 56, and optionally, wherein the message comprises a topology index field comprising the topology type information.

Example 58 includes the subject matter of Example 56 or 57, and optionally, wherein the message comprises an attribute ID field comprising the topology type information.

Example 59 includes the subject matter of any one of Examples 56-58, and optionally, wherein the topology type information comprises a first index value to indicate a fully connected topology, a second index value to indicate a one-to-many topology, or a third index value to indicate one-to-one topology.

Example 60 includes the subject matter of any one of Examples 55-59, and optionally, wherein the message comprises a service discovery frame or a NAN management frame.

Example 61 includes the subject matter of any one of Examples 44-60, and optionally, comprising merging a first data path group comprising a first plurality of NAN devices and a second data path group comprising a second plurality of NAN devices into a third data path group comprising the first and second pluralities of NAN devices, the first, second and third data path groups all having the same data path topology.

Example 62 includes the subject matter of any one of Examples 44-61, and optionally, comprising receiving an indication of the data path topology from a service to be provided to the data path group, and forming the data path group based on the indication of the data path topology.

Example 63 includes the subject matter of any one of Examples 44-62, and optionally, comprising determining the data path topology based on one or more attributes of a service to be provided to the data path group.

Example 64 includes the subject matter of any one of Examples 44-63, and optionally, wherein the scheduling scheme comprises a combination of channel and time resources.

Example 65 comprises a product comprising one or more tangible computer-readable non-transitory storage media comprising computer-executable instructions operable to, when executed by at least one computer processor, enable the at least one computer processor to implement one or more operations at a Neighbor Awareness Networking (NAN) device, the operations comprising communicating during one or more Discovery Windows (DW) of a NAN cluster; and communicating with one or more NAN devices of at least one data path group having a data path topology according to a scheduling scheme corresponding to the data path topology, the data path group comprising two or more NAN devices of the NAN cluster.

Example 66 includes the subject matter of Example 65, and optionally, wherein the data path topology comprises a fully connected topology, in which each device of the data path group is to directly communicate with each other device of the data path group.

Example 67 includes the subject matter of Example 66, and optionally, wherein the scheduling scheme comprises a common schedule for all devices of the data path group.

Example 68 includes the subject matter of Example 65, and optionally, wherein the data path topology comprises a one-to-many topology, in which a source device of the data path group is to directly communicate with each other device of the data path group.

Example 69 includes the subject matter of Example 68, and optionally, wherein the scheduling scheme comprises a common schedule for all devices of the data path group.

Example 70 includes the subject matter of Example 65, and optionally, wherein the data path topology comprises a one-to-one topology, in which one or more pairs of devices are to communicate over one or more respective one-to-one data links.

Example 71 includes the subject matter of Example 70, and optionally, wherein the scheduling scheme comprises a common schedule for a pair of devices.

Example 72 includes the subject matter of any one of Examples 65-71, and optionally, wherein the operations comprise communicating with one or more first NAN devices of a first data path group having a first data path topology according to a first schedule, and communicating with one or more second NAN devices of a second data path group having a second data path topology according to a second schedule.

Example 73 includes the subject matter of Example 72, and optionally, wherein the second data path topology is different from the first data path topology.

Example 74 includes the subject matter of Example 72 or 73, and optionally, wherein the second schedule is different from the first schedule.

Example 75 includes the subject matter of any one of Examples 65-74, and optionally, wherein the operations comprise forming the data path group based on the data path topology, and determining the scheduling scheme according to the data path topology.

Example 76 includes the subject matter of any one of Examples 65-75, and optionally, wherein the operations comprise transmitting a message comprising topology information corresponding to the data path topology.

Example 77 includes the subject matter of Example 76, and optionally, wherein the topology information comprises topology type information to indicate a type of the data path topology, a group identifier (ID) to identify the data path group, schedule information to indicate a schedule of the data path group, and an indication of a controller of the data path group.

Example 78 includes the subject matter of Example 77, and optionally, wherein the message comprises a topology index field comprising the topology type information.

Example 79 includes the subject matter of Example 77 or 78, and optionally, wherein the message comprises an attribute ID field comprising the topology type information.

Example 80 includes the subject matter of any one of Examples 77-79, and optionally, wherein the topology type information comprises a first index value to indicate a fully connected topology, a second index value to indicate a one-to-many topology, or a third index value to indicate one-to-one topology.

Example 81 includes the subject matter of any one of Examples 76-80, and optionally, wherein the message comprises a service discovery frame or a NAN management frame.

Example 82 includes the subject matter of any one of Examples 65-81, and optionally, wherein the operations comprise merging a first data path group comprising a first plurality of NAN devices and a second data path group comprising a second plurality of NAN devices into a third data path group comprising the first and second pluralities of NAN devices, the first, second and third data path groups all having the same data path topology.

Example 83 includes the subject matter of any one of Examples 65-82, and optionally, wherein the operations comprise receiving an indication of the data path topology from a service to be provided to the data path group, and forming the data path group based on the indication of the data path topology.

Example 84 includes the subject matter of any one of Examples 65-83, and optionally, wherein the operations comprise determining the data path topology based on one or more attributes of a service to be provided to the data path group.

Example 85 includes the subject matter of any one of Examples 65-84, and optionally, wherein the scheduling scheme comprises a combination of channel and time resources.

Example 86 comprises an apparatus of wireless communication comprising a Neighbor Awareness Networking (NAN) device, the apparatus comprising means for communicating during one or more Discovery Windows (DW) of a NAN cluster; and means for communicating with one or more NAN devices of at least one data path group having a data path topology according to a scheduling scheme corresponding to the data path topology, the data path group comprising two or more NAN devices of the NAN cluster.

Example 87 includes the subject matter of Example 86, and optionally, wherein the data path topology comprises a fully connected topology, in which each device of the data path group is to directly communicate with each other device of the data path group.

Example 88 includes the subject matter of Example 87, and optionally, wherein the scheduling scheme comprises a common schedule for all devices of the data path group.

Example 89 includes the subject matter of Example 86, and optionally, wherein the data path topology comprises a one-to-many topology, in which a source device of the data path group is to directly communicate with each other device of the data path group.

Example 90 includes the subject matter of Example 89, and optionally, wherein the scheduling scheme comprises a common schedule for all devices of the data path group.

Example 91 includes the subject matter of Example 86, and optionally, wherein the data path topology comprises a one-to-one topology, in which one or more pairs of devices are to communicate over one or more respective one-to-one data links.

Example 92 includes the subject matter of Example 91, and optionally, wherein the scheduling scheme comprises a common schedule for a pair of devices.

Example 93 includes the subject matter of any one of Examples 86-92, and optionally, comprising means for communicating with one or more first NAN devices of a first data path group having a first data path topology according to a first schedule, and communicating with one or more second NAN devices of a second data path group having a second data path topology according to a second schedule.

Example 94 includes the subject matter of Example 93, and optionally, wherein the second data path topology is different from the first data path topology.

Example 95 includes the subject matter of Example 93 or 94, and optionally, wherein the second schedule is different from the first schedule.

Example 96 includes the subject matter of any one of Examples 86-95, and optionally, comprising means for forming the data path group based on the data path topology, and determining the scheduling scheme according to the data path topology.

Example 97 includes the subject matter of any one of Examples 86-96, and optionally, comprising means for transmitting a message comprising topology information corresponding to the data path topology.

Example 98 includes the subject matter of Example 97, and optionally, wherein the topology information comprises topology type information to indicate a type of the data path topology, a group identifier (ID) to identify the data path group, schedule information to indicate a schedule of the data path group, and an indication of a controller of the data path group.

Example 99 includes the subject matter of Example 98, and optionally, wherein the message comprises a topology index field comprising the topology type information.

Example 100 includes the subject matter of Example 98 or 99, and optionally, wherein the message comprises an attribute ID field comprising the topology type information.

Example 101 includes the subject matter of any one of Examples 98-100, and optionally, wherein the topology type information comprises a first index value to indicate a fully connected topology, a second index value to indicate a one-to-many topology, or a third index value to indicate one-to-one topology.

Example 102 includes the subject matter of any one of Examples 97-101, and optionally, wherein the message comprises a service discovery frame or a NAN management frame.

Example 103 includes the subject matter of any one of Examples 86-102, and optionally, comprising means for merging a first data path group comprising a first plurality of NAN devices and a second data path group comprising a second plurality of NAN devices into a third data path group comprising the first and second pluralities of NAN devices, the first, second and third data path groups all having the same data path topology.

Example 104 includes the subject matter of any one of Examples 86-103, and optionally, comprising means for receiving an indication of the data path topology from a service to be provided to the data path group, and forming the data path group based on the indication of the data path topology.

Example 105 includes the subject matter of any one of Examples 86-104, and optionally, comprising means for determining the data path topology based on one or more attributes of a service to be provided to the data path group.

Example 106 includes the subject matter of any one of Examples 86-105, and optionally, wherein the scheduling scheme comprises a combination of channel and time resources.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A product comprising one or more tangible computer-readable non-transitory storage media comprising computer-executable instructions operable to, when executed by at least one processor, enable the at least one processor to cause a Neighbor Awareness Networking (NAN) device to:
   determine a schedule of resources of a NAN group for data communication between a plurality of NAN devices;
   set in a first field of a group attribute a predefined group type value to indicate a group type of the NAN group from a plurality of predefined group types, wherein the plurality of predefined group types comprises a one-to-many group type and another group type different from the one-to-many group type;
   set in a second field of the group attribute information to indicate a source of the NAN group;
   transmit a NAN frame comprising at least the first and second fields of the group attribute and schedule information to indicate the schedule of resources of the NAN group; and
   communicate data transmissions in the NAN group according to the schedule of resources of the NAN group.

2. The product of claim 1, wherein the instructions, when executed, cause the NAN device to set the first field of the group attribute to indicate the one-to-many group type.

3. The product of claim 1, wherein the one-to-many group type comprises a NAN group having one source.

4. The product of claim 1, wherein the instructions, when executed, cause the NAN device to form the NAN group based on a request from a service on the NAN device.

5. The product of claim 1, wherein the instructions, when executed, cause the NAN device to form the NAN group for data communication of a specific service.

6. The product of claim 1, wherein the instructions, when executed, cause the NAN device to determine the group type of the NAN group based on an indication from a service on the NAN device.

7. The product of claim 1, wherein the NAN frame comprises a NAN management frame.

8. The product of claim 1, wherein the NAN frame comprises a service discovery frame.

9. The product of claim 1, wherein the source of the NAN group comprises a creator of the NAN group.

10. The product of claim 1, wherein the source of the NAN group comprises a point of control of the NAN group.

11. The product of claim 1, wherein the schedule of resources of the NAN group comprises a plurality of time slots outside NAN discovery windows.

12. The product of claim 1, wherein the NAN group comprises a multicast group.

13. The product of claim 1, wherein the instructions, when executed, cause the NAN device to set the first field of the group attribute to indicate the group type different from the one-to-many group type.

14. An apparatus comprising:

memory circuitry; and a processor comprising logic and circuitry configured to cause a Neighbor Awareness Networking (NAN) device to:

determine a schedule of resources of a NAN group for data communication between a plurality of NAN devices;

set in a first field of a group attribute a predefined group type value to indicate a group type of the NAN group from a plurality of predefined group types, wherein the plurality of predefined group types comprises a one-to-many group type and another group type different from the one-to-many group type;

set in a second field of the group attribute information to indicate a source of the NAN group;

transmit a NAN frame comprising at least the first and second fields of the group attribute and schedule information to indicate the schedule of resources of the NAN group; and communicate data transmissions in the NAN group according to the schedule of resources of the NAN group.

15. The apparatus of claim 14 configured to cause the NAN device to set the first field of the group attribute to indicate the one-to-many group type.

16. The apparatus of claim 14, wherein the source of the NAN group comprises a point of control of the NAN group.

17. The apparatus of claim 14 configured to cause the NAN device set the first field of the group attribute to indicate the group type different from the one-to-many group type.

18. The apparatus of claim 14 configured to cause the NAN device to form the NAN group for data communication of a specific service.

19. The apparatus of claim 14 configured to cause the NAN device to determine the group type of the NAN group based on an indication from a service on the NAN device.

20. The apparatus of claim 14 comprising a radio, the processor configured to cause transmission of the NAN frame by the radio.

21. The apparatus of claim 20 comprising one or more antennas connected to the radio, and another processor to execute instructions of an operating system (OS) of the NAN device.

22. An apparatus comprising:

means for causing a Neighbor Awareness Networking (NAN) device to determine a schedule of resources of a NAN group for data communication between a plurality of NAN devices;

means for causing the NAN device to set in a first field of a group attribute a predefined group type value to indicate a group type of the NAN group from a plurality of predefined group types, wherein the plurality of predefined group types comprises a one-to-many group type and another group type different from the one-to-many group type;

means for causing the NAN device to set in a second field of the group attribute information to indicate a source of the NAN group;

means for causing the NAN device to transmit a NAN frame comprising at least the first and second fields of the group attribute and schedule information to indicate the schedule of resources of the NAN group; and means for causing the NAN device to communicate data transmissions in the NAN group according to the schedule of resources of the NAN group.

23. The apparatus of claim 22 comprising means for determining the group type of the NAN group based on an indication from a service on the NAN device.

* * * * *

UNITED STATES PATENT AND TRADEMARK OFFICE
CERTIFICATE OF CORRECTION

| | |
|---|---|
| PATENT NO. | : 11,252,552 B2 |
| APPLICATION NO. | : 16/125710 |
| DATED | : February 15, 2022 |
| INVENTOR(S) | : Huang et al. |

It is certified that error appears in the above-identified patent and that said Letters Patent is hereby corrected as shown below:

On the Title Page

Item (71), delete "INTEL IP CORPORATION, Santa Clara, CA (US)" and insert -- INTEL CORPORATION, Santa Clara, CA (US) --, therefor Signed and Sealed this
Thirty-first Day of May, 2022

Katherine Kelly Vidal
*Director of the United States Patent and Trademark Office*